United States Patent [19]

Johnson

[11] Patent Number: 5,011,344
[45] Date of Patent: Apr. 30, 1991

[54] POSITIVE DRIVE ADAPTER

[75] Inventor: Allan S. Johnson, Newport Beach, Calif.

[73] Assignee: Tapmatic Corporation, Irvine, Calif.

[21] Appl. No.: 572,349

[22] Filed: Aug. 27, 1990

Related U.S. Application Data

[63] Continuation of Ser. No. 278,371, Dec. 1, 1988, abandoned.

[51] Int. Cl.$^5$ ............................................. B23B 31/12
[52] U.S. Cl. ................................. 408/240; 279/82; 279/74
[58] Field of Search .................. 408/240, 239 R, 226; 279/76.1 B, 85, 84, 19.4, 55, 57, 78, 80, 82, 74, 66

[56] References Cited

U.S. PATENT DOCUMENTS

| | | | |
|---|---|---|---|
| 548,037 | 10/1895 | Cox, Jr. et al. | 279/81 |
| 571,461 | 12/1896 | Swanson | 279/84 |
| 1,317,019 | 4/1918 | Keller | 279/19.4 |
| 2,135,861 | 11/1938 | Thompson | 279/76 X |
| 3,353,834 | 11/1967 | Bay | 279/82 |
| 3,735,993 | 5/1973 | Seibert | 279/1 B |
| 3,985,368 | 10/1976 | Better et al. | 279/1 B X |
| 4,174,113 | 11/1979 | Eckman | 279/1 B X |
| 4,502,824 | 3/1985 | Dahse et al. | 279/1 B X |
| 4,692,073 | 9/1987 | Martindell | 279/1 B X |

FOREIGN PATENT DOCUMENTS

| | | | |
|---|---|---|---|
| 871990 | 3/1953 | Fed. Rep. of Germany | 408/226 |
| 2413021 | 10/1975 | Fed. Rep. of Germany | 279/82 |

Primary Examiner—Larry I. Schwartz
Assistant Examiner—Robert L. Shultz
Attorney, Agent, or Firm—Evanns & Walsh

[57] ABSTRACT

The invention is a quick change holding device for tools and, more particularly, for taps. The holder has an axially movable collar cooperable with holding elements which can be placed in holding position relative to an annular groove in the tap and released therefrom. The holding elements are curved, that is arcuate individual members having rounded, that is, curved, surfaces on the outsides thereof. The inner rounded or curved surface of the holding element comes into contiguous flush mating engagement with the annular groove in the tap, whereby improved holding capability is achieved.

4 Claims, 3 Drawing Sheets

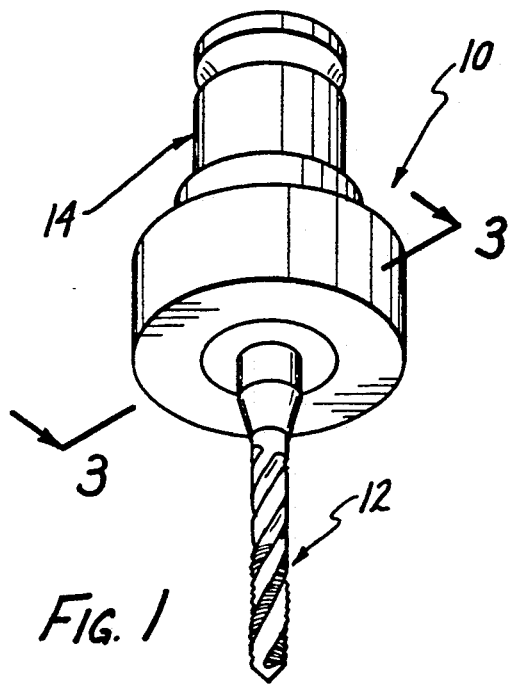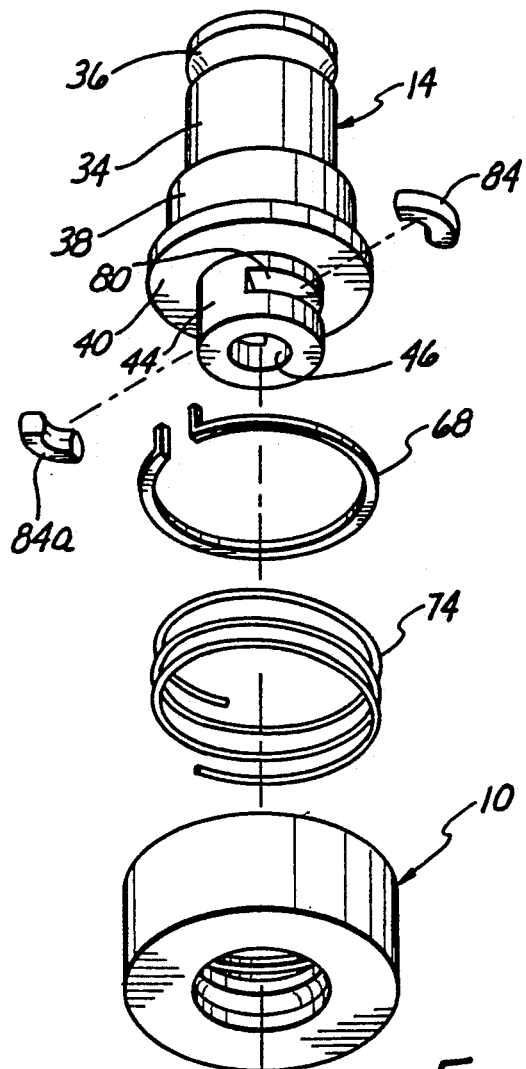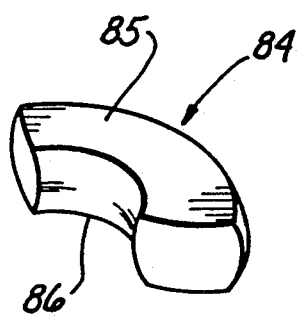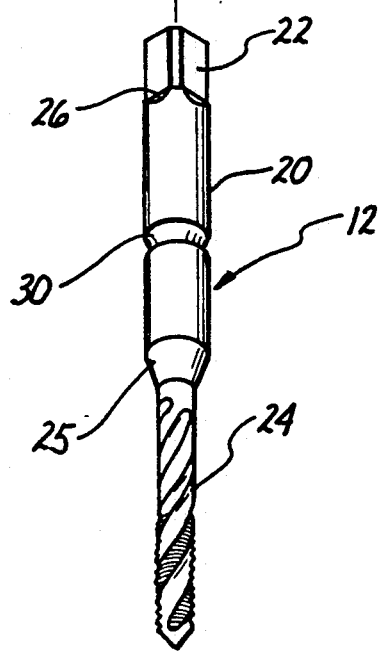
Fig. 1
Fig. 2
Fig. 2a

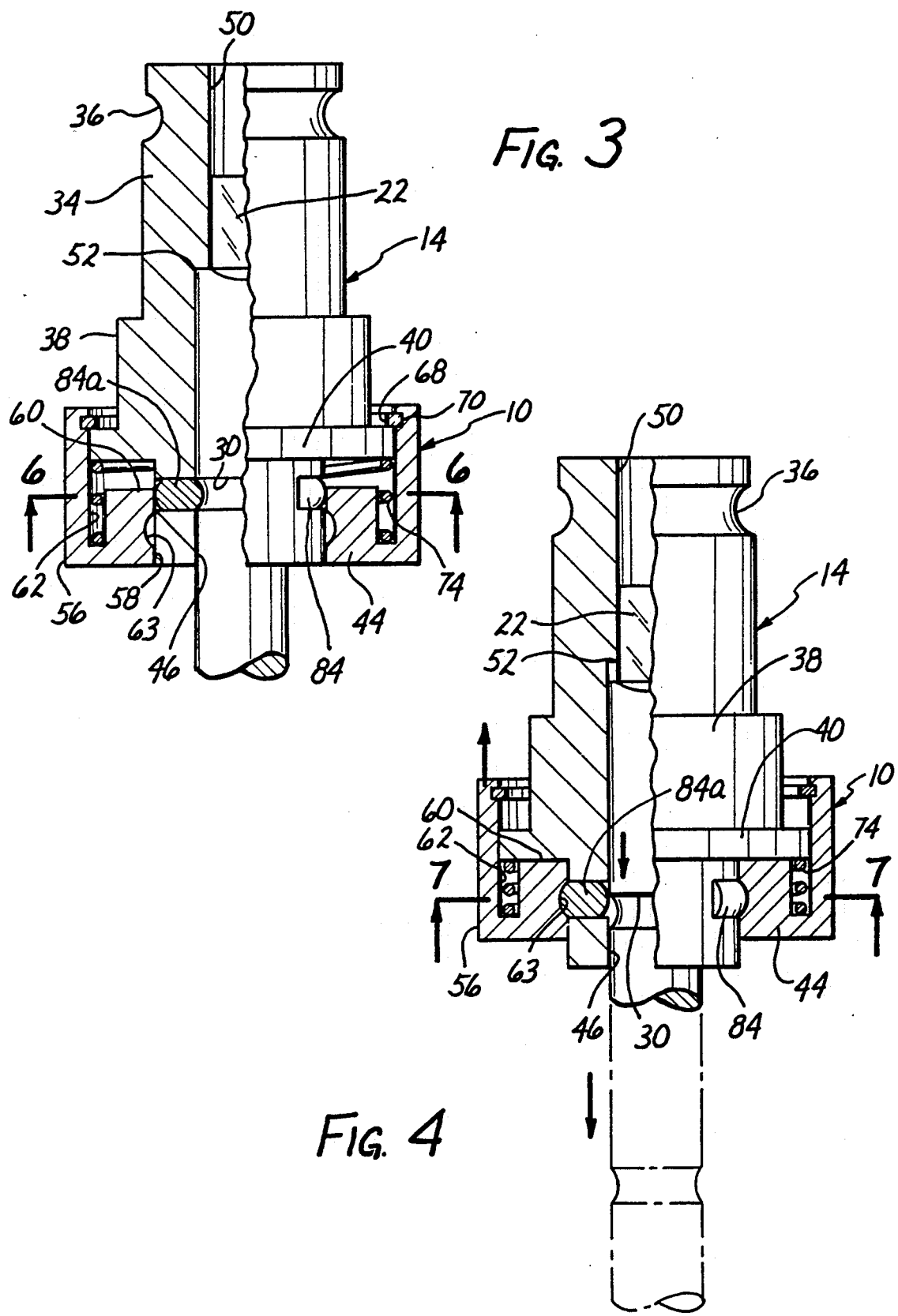

POSITIVE DRIVE ADAPTER

This is a continuation of copending application Ser. No. 07/278,371 filed on Dec. 1, 1988, now abandoned.

BACKGROUND OF THE INVENTION

1. Field of the Invention

The field of the invention is that of adapters or holders for a tool which may be in the form of a bit or tap, the improvements residing in the structure for holding the tool.

2. Description of the Prior Art

Adapters or holders for tools, such as a bit or a tap, have been known in the prior art. In certain known types of these devices, particularly devices which have a quick change capability, the tool has been held by way of spherical balls that have a radial movement and are held against the sides of the tool to hold it in position. Quick change devices of this type typically embody a collar which is movable axially with respect to the body of the adapter or holder for purposes of moving the holding elements radially into holding position and out of holding position into a release position. In devices of the type described, an axially movable collar is provided which when moved axially can engage the holding devices, that is, the spherical balls, to move them inwardly against a holding surface on the tool. The balls move in openings in the side walls of the holder. Reference is made to U.S. Pat. No. 4,234,277.

Holders for tools such as described in the foregoing are subject to a serious deficiency. Since the tool itself is cylindrical, when the balls are moved radially to hold it, they have only a point contact in the case where the balls are held against the cylindrical surface of the tool or otherwise, they only have a limited contact with the tool where the tool is provided with an annular groove.

The herein invention as described in detail hereinafter is one which makes available a construction which fully overcomes the deficiencies of the prior art, particularly the deficiencies referred to in the foregoing.

SUMMARY OF THE INVENTION

A preferred form of the invention is described in detail hereinafter which, in the exemplary form, is shown as a quick change adapter or holding device for use with a tap which is driven by a driver or driving machine.

In the exemplary form of the invention, it is in the form of a holder for the tool providing capabilities such that quick release by a manual movement is realized, and similarly, the adapter is placed in a holding position by manual movement.

A body is provided which includes an axially movable collar, which can be moved axially against a spring to effect release of the tool. In the exemplary form of the invention, the adapter cooperates with a tap which has an annular groove which receives or in which the holding elements are brought in contact.

Holding elements are provided which are carried by the body of the adapter and which are radially movable by the axially movable collar. The holding elements are of unique construction. Preferably, two holding elements are provided, although more than two could be used. The holding elements move in arcuate slots in the side walls of the holder. The holding elements are of arcuate, that is, curved, construction with limited angular extent, of a size and shape to be movable in the slots in the holder. The holding elements which as stated are of limited angular extent are suitable to fit into the arcuate or angular slots in the holding member. Each holding element is like a curved or arcuate piece of round wire preferably being flattened on the top and bottom but, therefore, presenting an outwardly bulged, that is, curved, surface formation both on the inside and the outside of the element. It is to be seen, therefore, that when one of these elements is moved radially towards the tool, that is, towards the annular groove in the tool, the inside rounded or curved surface of the holding element comes into flush contiguous or mating engagement throughout its angular length, with the inside surface of the annular groove in the tool. Thus, there is a substantial area of flush, that is, contiguous, mating surfaces. Thus, the holding capability of the adapter or holder with respect to the tool is very substantially increased. In the case of a tap which is to cut a thread in a hole, there is of course an axial thrust against the tap as it goes into the hole. This thrust has to be taken by the holding elements of the holding device. Thus, if the holding elements do not have sufficient holding capability, the tap will not be held in position, which is a predetermined precise position and tapping, particularly under computer numerical control will be affected. That is, axial movement of the tap can cause deformation of parts of the mechanism.

In the light of the foregoing, the primary objects of the invention are to provide an improvement in adapters or holding devices for a tool, which in the exemplary form of the invention is a tap, and to realize a device having greater holding capability with respect to the tool.

A further object is to realize a device as in the foregoing wherein the holding elements are not spherical balls but are curved or arcuate members of limited angular extent which are movable radially through slots in the holder, the elements having curved surfaces both on the inside and the outside to provide for improved operation and holding capability.

Further objects and additional advantages of the invention will become apparent from the following detailed description and annexed drawings.

BRIEF DESCRIPTION OF THE DRAWINGS

FIG. 1 is an isometric external view of the adapter of the invention with a tap in position;

FIG. 2 is an exploded isometric view of the adapter and the tap of FIG. 1;

FIG. 2a is a detail isometric view of one of the holding elements or dogs that operate to hold the tap in position;

FIG. 3 is a cross-sectional view of the adapter of FIGS. 1 and 2;

FIG. 4 is a cross-sectional view similar to that of FIG. 4, showing the adapter in released position of the tap;

DESCRIPTION OF A PREFERRED EMBODIMENT AND BEST MODE OF PRACTICE

Figure 5:
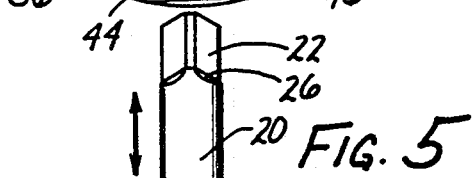
FIG. 5 is an isometric view partly in section of the adapter and tap of FIG. 1.

Reference is made to all of the figures of the drawings, all of which illustrate a preferred embodiment of the invention. The adapter includes a cylindrical collar 10 which will be referred to again presently and also a body 14, the collar 10 fitting over an end part of the body 14 and being able to be moved axially with respect to the body. The body 14 has a bore in it, as will be referred to presently, into which the tap 12 fits and is held. The tap itself is shown in FIGS. 1, 2 and 5. The tap has a cylindrical body part 20, and it has a square identified at 22 at one end, and the cutting thread 24 appears at the other end, there being a bevel 25 between the portion 22 and the thread 24. At an intermediate point of the tap, it has an annular groove identified at 30, the center of which is at a fixed predetermined distance from the end of the tap, that is, the end of the thread cutting part 24, for purposes which will be described. There is a square radial shoulder at the inner end of the square 22, as identified as 26.

Referring now more particularly to the exploded view FIG. 2, it will be seen that the body 14 has a cylindrical portion 34, at the upper end of which is an annular groove 36, by means of which the adapter itself can be held within a driving machine or driver. The body 14 has a further cylindrical part 38 of larger diameter, and below that part, it has a part 40 of a still larger diameter which is in the form of a flange, as shown.

The body 14 has an extending cylindrical part 44 of smaller diameter, and this part has a bore 46 therein which extends upwardly within the body 44, terminating in a counterbore 50 of a smaller diameter, there being a square shoulder 52 between the bore and counterbore, and the square shoulder 26 on the tap may come into engagement with the shoulder 52 with the square end 22 extending up into the counterbore 50, as may be seen in FIGS. 3 and 4.

The construction of the collar 10 is shown more in detail in FIGS. 3 and 4. It has an outer cylindrical part, as designated at 56, and it has a bore in it, as designated at 58, on the inside of an inner part 60 of lesser axial dimension which provides for a circumferential slot, as designated at 62, between the part 60 and the outer portion of the part 56.

Numeral 68 designates a snap ring that fits into an annular groove 70 within the upper part of the collar 10. The snap ring is of known type construction and serves a purpose to limit the axial movement of the collar 10, as may be seen in FIGS. 3 and 4. That is, the collar 10 is movable axially with respect to the body 14, as will be described.

Positioned within the circumferential slot 62 is a coil spring 74 which is interposed between the bottom of the slot and the lower surface of the portion 40 of the body 14, as may be seen. FIG. 2 illustrates how the parts so far described interfit with each other, this also being shown in FIGS. 3, 4 and 5.

A significant part of the invention is the manner, that is, the construction, whereby the tap 12 is firmly held within the adapter, that is, within the body 14. The center of the annular groove 30 is at a fixed precise predetermined distance from the end of the tap 12, that is, the end of the threaded part 24. By controlling this dimension precisely, when the tap is in the adapter and it is mounted in the driver or driving machine, which may be controlled by a computer utilizing numerical control, the computer knows exactly, with respect to the machine and the adapter or holder of the tap, how far the end of the tap will be extending from the machine. It has been found that in manufacture, it is not possible to hold the axial distance between the center of the annular groove 30 and the shoulder 26 with sufficient exactitude so that the shoulder 26 on the tap can come into engagement with the shoulder 52 between the bore 46 and the counterbore 50 in the body 14.

Figure 6:
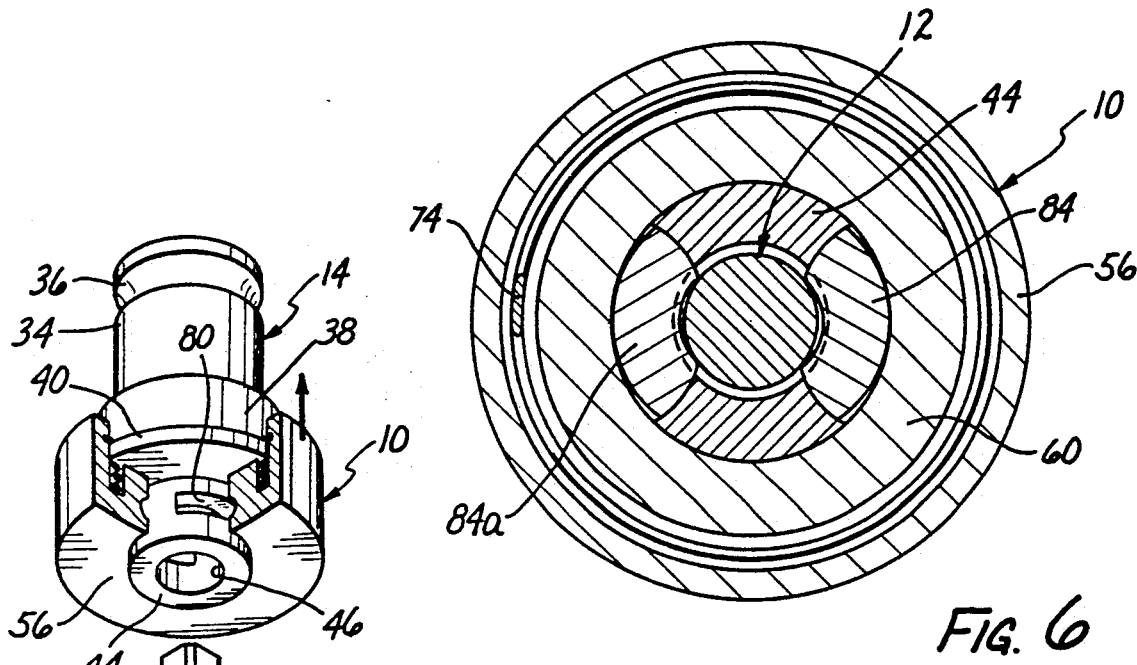
FIG. 6 is a cross-sectional view taken along the line 6—6 of FIG. 3.
Figure 7:
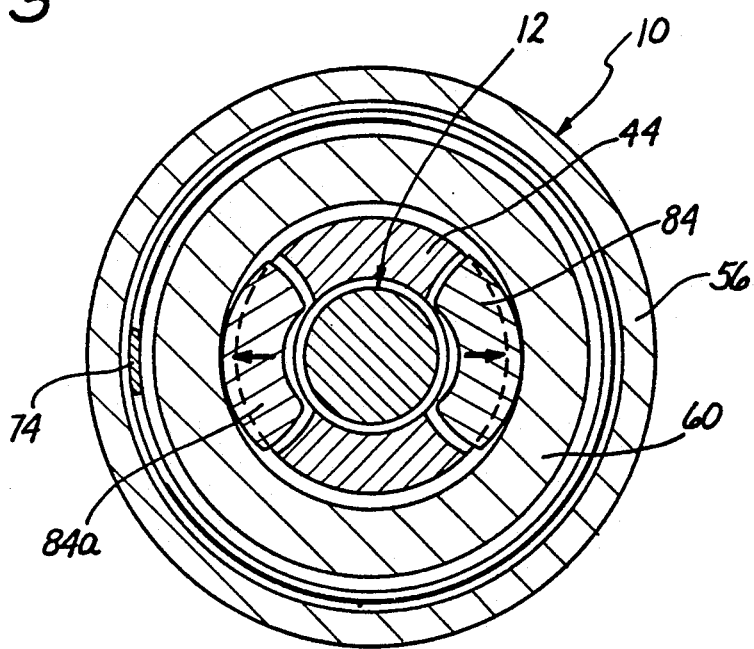
FIG. 7 is a cross-sectional view taken along the line 7—7 of FIG. 4.

The portion or part 44 of the body 14 has in its side an angular slot or opening 80, having a shape as may be seen in FIG. 2 and in FIG. 5. On the opposite side of the part 44 is a similar slot designated by the numeral 80a. These slots may extend for an angular extent of approximately the extent as illustrated in FIGS. 6 and 7, the angular extent not being critical. Numerals 84 and 84a designate angular holding elements or holding dogs which have a curved or arcuate shape, the element 84 being shown isometrically in FIG. 2a. The cross-section of these elements can be seen in FIGS. 3 and 4 and, also, FIGS. 6 and 7.

A preferred shape of these elements can be understood from the following. Each can be considered as made from a curved section of round wire that has been flattened at the top and bottom. Such flattened surfaces have been designated at 85 and 86 in FIG. 2a. Thus, the outside of the element 84 has curvature, as may be seen, and the inside of the element also has curvature, these curvatures being readily visible on FIGS. 3 and 4. The holding elements 84 and 84a in the slots 80 and 80a serve the purpose of engaging in the annular groove 30 in the tap 12 for purposes of firmly holding it, that is, positively, in position and in an accurately known precise position which, as explained above, enables the computer-controlled machine to accurately select and position the adapter and tap for operations.

The adapter or holder for the tap is a quick change device. FIG. 3 shows the position of the collar 10 on the body 14 in which the holding elements 84 and 84a are in position engaging in the annular groove 30, holding the tap firmly in position. The collar 10 is axially movable with respect to the tap 12 and can be moved upwardly against the spring 74 into a position as shown in FIG. 4, wherein the holding elements 84 and 84a are disengaged from the annular groove 30 in the tap 12 so that it can be moved axially, that is, withdrawn, from the body 14. See the cross-sectional views FIGS. 6 and 7.

The part 60 of the collar 10 has on the inside of it an annular groove, as designated at 63. In the position of FIG. 3, the elements 84 and 84a are not in the groove 63, but they are into this groove in the position of FIG. 4, in which position they have been moved outwardly as a result of an upward axial movement of the collar 10 with respect to the body 14.

The cross-sectional view of FIG. 6 illustrates the positions of the holding elements 84 and 84a when the collar 10 is in the position of FIG. 3. The cross-sectional view of FIG. 7 shows the holding elements 84 and 84a moved radially outward to be in the position in which they are shown in FIG. 4, where they are moved to fit into the annular groove 63 in the part 44 of the collar 10. The axial movement of collar 10 produces the radial movements of elements 84 and 84a.

From the foregoing, it is to be observed that the curved interior arcuate surfaces of the holding elements 84 and 84c come into contiguous flush mating engagement with the curved inside surface of the annular groove 30. That is, there is an increased area of flush or contiguous mating curved surfaces rather than there being only a point or line contact as where spherical balls are used as holding elements. As pointed out in the foregoing, when tapping is to begin and the tap reaches the hole to be tapped, there is axial thrust exerted upon the tap 12, which axial thrust has to be taken by the holding elements 84 and 84a. Where only spherical balls are used as holding elements, their holding capability has been found not sufficient to absorb the thrust on the tap, with the result that deformation of parts can occur.

From the foregoing, those skilled in the art will readily understand the nature and construction of the invention and the manner in which the objects as set forth in the foregoing are realized. The device is quick acting, that is, it is a manually actuatable quick release device, whereby (in the exemplary embodiment) a tap can be firmly and positively held in a precise operating position but yet can be quickly released merely by an axial movement of a collar on the adapter body. The holding elements are of a construction to provide the flush contiguous engagement of surfaces, or mating surfaces so to speak, so that the tap can be held firmly without deformation of any parts.

The foregoing disclosure is representative of a preferred embodiment of the invention and is intended to be illustrative rather than limiting, the invention to be accorded the full scope of the claims appended hereto.

What is claimed is:

1. In a quick change holder having a longitudinal axis adapted for holding a tool which has an end part and which has a holding formation in the form of a groove in it spaced at a predetermined distance from the end of the tool, and comprising a body configured to receive the tool, including a portion to receive said end part of the tool, an axially moveable collar moveably mounted upon said body having at least one position for holding the tool and at least one position for releasing the tool from the holder and including a radially inner section, and at least one element contained in at least one slot defined in the body for engaging said groove in said tool in holding engagement when said collar is in said at least one position for holding the tool and for disengaging from the groove in the aforesaid tool to permit the aforesaid tool to be released from holding engagement when said collar is in said at least one release position, the improvement comprising said at least one element having an arcuate truncated toroidal configuration having a convex radially inner surface configured to engage a complementary section of the said holding formation in the form of a groove in the tool, the radially outer surface of said at least one element being convex, the collar having a radially inner surface including a substantially flat portion and a portion having a recess defined therein for receiving the convex radially outer surface of said at least one element in said at least one release position of the collar, whereby in said at least one release position said at least one element is movable radially outwardly into said recess in said inner surface of said collar by virtue of removal of said tool from engagement with said at least one element, and whereby in said at least one holding position said substantially flat portion of said collar engages with said radially outer surface of said at least one element to hold the radially inner surface of said at least one element in holding engagement with said complementary section of said holding formation in the form of a groove in said tool.

2. The invention as set forth in claim 1, wherein the at least one slot in said body defines at least one circumferential slot of limited angular extent, the said at least one element being configured to be received in said circumferential slot.

3. The invention as set forth in claim 2, wherein the said at least one element has a top surface and a bottom surface, which top surface and which bottom surface are each substantially planar adapting said at least one element to be received in said at least one circumferential slot in said body.

4. The invention as set forth in claim 2, wherein the said body has at least two of said circumferential slots and being provided with at least two of the said elements which are movable radially to engage the tool.

* * * * *